US011027565B2

(12) United States Patent
Woizeschke et al.

(10) Patent No.: US 11,027,565 B2
(45) Date of Patent: Jun. 8, 2021

(54) CARD PRINTER ALIGNMENT BRACKET

(71) Applicant: ASSA ABLOY AB, Stockholm (SE)

(72) Inventors: Michael Jon Woizeschke, Shakopee, MN (US); Tanya Jegeris Snyder, Edina, MN (US); John P. Skoglund, Prior Lake, MN (US)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 16/590,851

(22) Filed: Oct. 2, 2019

(65) Prior Publication Data

US 2021/0101394 A1    Apr. 8, 2021

(51) Int. Cl.
*B41J 13/12*    (2006.01)
*B41J 11/00*    (2006.01)
*B41J 13/10*    (2006.01)

(52) U.S. Cl.
CPC ............. *B41J 13/12* (2013.01); *B41J 11/008* (2013.01); *B41J 11/0095* (2013.01); *B41J 13/103* (2013.01)

(58) Field of Classification Search
CPC ...... B41J 13/12; B41J 13/103; B41J 11/0095; B41J 11/008; B41J 11/006; B41J 11/0065; B41J 11/007; B41J 13/0054; B41J 13/106; B41J 13/18; B41J 13/223; B41J 13/226; B41J 13/24; B41J 13/32
See application file for complete search history.

(56) References Cited

U.S. PATENT DOCUMENTS 5,423,619 A * 6/1995 Kohno .................... B41J 13/12
271/131
8,152,291 B2    4/2012 Greinwald 10,173,441 B2 * 1/2019 Takeshita ............... G06K 13/14
2003/0024422 A1    2/2003 Pribula et al.
2006/0267270 A1    11/2006 Suzuki et al.
(Continued)

FOREIGN PATENT DOCUMENTS

| EP | 3689624 | 8/2020 |
|---|---|---|
| JP | H0761655 | 3/1995 |
| JP | 2004307120 | 11/2004 |

(Continued)

OTHER PUBLICATIONS

"European Application Serial No. 20199224.5, Extended European Search Report dated Mar. 17, 2021", 15 pgs.

*Primary Examiner* — Kristal Feggins
(74) *Attorney, Agent, or Firm* — Schwegman Lundberg & Woessner, P.A.

(57) ABSTRACT

The disclosure describes a method for aligning a card on a printer belt. A printer includes the belt, a print unit having a head, and a card feeder having an alignment bracket. The card feeder deposits a card onto the belt along a processing axis in a first orientation. The belt moves the card away from the card feeder in a first direction. The card feeder is positioned in a second orientation where the alignment bracket aligns with the belt. The alignment bracket has a rear wall and a guide extending therefrom that align the card within the alignment bracket. The belt is overdriven in a second direction and the card moves into the alignment bracket for alignment. The belt then moves in the first direction and the card clears the alignment bracket. The card feeder is then positioned in a third orientation to allow printing with the head.

19 Claims, 9 Drawing Sheets

(56) References Cited

U.S. PATENT DOCUMENTS

2013/0220984 A1  8/2013  Cronin et al.
2018/0365538 A1  12/2018  Ohta

FOREIGN PATENT DOCUMENTS

| JP | 2012193009 | 10/2012 |
| JP | 2018043807 | 3/2018 |
| WO | 2017099762 | 6/2017 |

* cited by examiner

CARD PRINTER ALIGNMENT BRACKET

TECHNICAL FIELD

Embodiments described herein generally relate to card product printers, and in particular, to alignment brackets for ink jet printers.

BACKGROUND

Card products, such as credit cards, identification cards, and security cards, are used for daily transactions. These card products generally include information printed thereon which allow them to be used for various transactions. For instance, credit cards and some security cards include magnetic strips that facilitate fiscal transactions and allow entry into secure locations. Identification cards also include information, such as a photo and demographic information, that may be used for various purposes.

The information on the card products that helps facilitate transactions may be formed thereon with ink jet printers. An ink jet printer may include a card feeder and a transport belt. The card feeder deposits the card product onto the transport belt and the transport belt moves the card product away from the card feeder and into a position that allows for a print head of the ink jet printer to print the information thereon. The print head then prints information onto the card product. Typically, in order to ensure proper printing, the print head must be in close proximity to a print surface of the card product. However, due to the close proximity of the print head to the card product, there is no room for card guides that can be used to properly align the card on the transport belt. Thus, if the card feeder improperly deposits the card product onto the transport belt, left of form (LOF) variation, where a card product moves in the same direction as a short edge of the card product, may occur from card product to card product. Furthermore, the card feeder may deposit the card product in a skewed position relative to the transport belt, or the card feeder may deposit the card too far forward on the transport belt or too far back on the transport belt.

If the card product is not properly positioned on the transport belt, the print head may not print all the necessary information onto the card product. Specifically, the print head moves along the card product while printing the information onto the card product. As may be appreciated, the card product should have a certain position under the printing head in order to allow for the print head to properly print the information onto the card product. Thus, if the card product is improperly positioned, e.g., the card product has a LOF variation or is skewed on the transport belt, etc., the card product may be misaligned relative to the print head. As a result, the information printed by the print head will not appear properly on the card product. For example, a photo may be misaligned on the card product, or certain information may not be printed onto the card product.

Therefore, a need exists for an alignment mechanism that properly aligns a card product onto a transport belt. Furthermore, the alignment mechanism should allow for a print head to be in close proximity with a print surface of a card product during printing.

SUMMARY

A method of aligning a card within printing device is provided. In an embodiment, the printing device includes a transport mechanism, such as a transport belt, a print unit that moves relative to the transport mechanism and along a card product disposed on the transport mechanism, thereby defining a print area. In an embodiment, the printing device also includes a card feeder having an alignment bracket that is disposed on the card feeder and proximate to the transport mechanism. In an embodiment, the alignment bracket has a pair of rear walls that form stops and a pair of guides that extend from the rear walls in a direction perpendicular to the rear walls. In an embodiment, the pair of rear walls minimize variation in skew of the card product while the pair of guides minimize LOF variation. During operation, in one embodiment, the card feeder moves into a first orientation and deposits a card product onto the transport mechanism along a processing axis. The transport mechanism then moves in a first direction away from the card feeder. While the transport mechanism is moving in the first direction, the card feeder moves into a second orientation where the alignment bracket is along the processing axis and aligns with the transport mechanism.

The transport mechanism then moves in a second direction towards the alignment bracket. In an embodiment, the transport mechanism is overdriven in the second direction in order to feed the card product into the alignment bracket. In one embodiment, when the card product is fed into the alignment bracket, a short end of the card product moves up against the pair of stops, thereby eliminating any skew variation that may have occurred while the card product was being deposited onto the transport mechanism. In one embodiment, when the card product is fed into the alignment bracket, the card product also moves along the guides where the guides orient the card product such that the card product is parallel to the processing axis thereby minimizing any type of LOF variation.

The transport mechanism then moves in the first direction thereby moving the card product out of the alignment bracket and clearing the card product from the alignment bracket. After the transport mechanism clears the card product from the alignment bracket, the card feeder moves into a third position. In the third position, the card feeder is below the processing axis such that the print unit may move over the card product without interference from the card feeder.

In a further embodiment, a printer that includes a transport mechanism and an alignment bracket is provided. In an embodiment, the transport mechanism has an exposed surface configured to engage and feed a card along a processing axis. Moreover, in an embodiment, the alignment bracket is proximate to the transport mechanism and includes a rear wall and a guide projecting in a perpendicular direction from the rear wall. In an embodiment, the rear wall engages a card when the card is moved into the alignment bracket where the guide is configured to align the card with the processing axis on the transport mechanism when the card moves into the alignment bracket.

In another embodiment, an alignment bracket for aligning a card product deposited onto a transport mechanism of a printer is provided. In one embodiment, the alignment bracket includes a housing, a front wall forming a front portion of the housing, and a rear wall within the housing. Furthermore, in an embodiment, the alignment bracket includes a pair of slanted walls extending from the front wall and a pair of guides. In one embodiment, the pair of guides perpendicularly extends between each of the pair of slanted walls and the rear wall such that the rear wall and the pair of guides define a cavity within the housing. In an embodiment, the rear wall is configured to engage with the card product when the card product moves into the alignment bracket and each of the pair of the guides are configured to align the product in parallel with each of the pair of guides when the card is in the alignment bracket.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
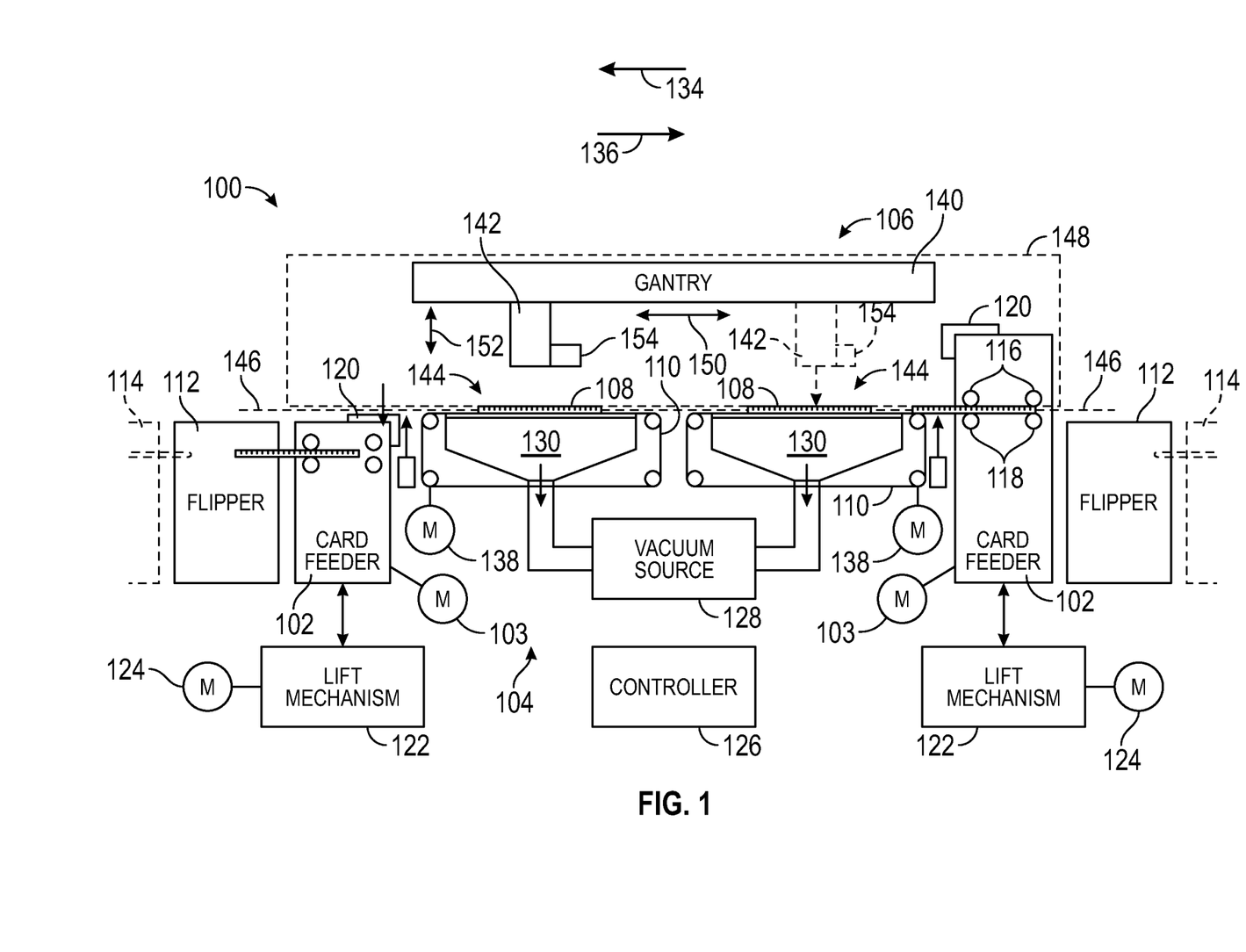
FIGS. 1 and 2 illustrate simplified side views of an ink jet printer or portions thereof in accordance with an embodiment of the present disclosure.

FIG. 1 illustrates a simplified side view of an ink jet printer 100 in accordance with an embodiment of the present disclosure. In an embodiment, the ink jet printer 100 includes a card feeder 102 having a motor 103, a card transport assembly 104, and a print unit 106. The card feeder 102 deposits a card product 108 onto a transport mechanism, such as a transport belt 110 of the card transport assembly 104 in order to facilitate ink jet printing onto the card product 108 by the print unit 106. In some embodiments, a card flipper 112 provides the card product 108 to the card feeder 102 from a card collector 114, such as a hopper. The card feeder 102 has idler rollers 116 and motorized feed rollers 118 which feed the card product 108 from the card feeder 102 to the card transport assembly 104 such that the card feeder 102 deposits the card product onto the transport belt 110. A card feeder frame 119 (FIG. 12) supports both the idler rollers 116 and the motorized feed rollers 118. The card feeder 102 includes an alignment bracket 120, which, as will be discussed in greater detail below, is used to align the card product 108 on the transport belt 110. As may be seen with reference to FIG. 1, the alignment bracket 120 is placed at an end of the card feeder near the transport belt 110 on top of the card feeder 102. Moreover, the alignment bracket 120 may be a separate piece attached to the card feeder 102. Alternatively, the alignment bracket 120 may be integrally formed with the card feeder 102 where the alignment bracket 120 and the card feeder 102 form a single, unitary piece.

The card feeder 102 moves to various positions during operation of the ink jet printer 100 via a lift mechanism 122 powered by a lift mechanism motor 124. In an embodiment, as will be discussed in greater detailed below, after the card feeder 102 deposits card product 108 onto the card transport belt 110, the card feeder 102 may be positioned with the lift mechanism 122 to align the card product 108. The lift mechanism 122 is controlled by a controller 126 and moves the card feeder 102 into at least three different positions during processing of the card product 108.

The card transport assembly 104 includes a vacuum source 128 coupled to a vacuum chamber 130. In an embodiment, the transport belt 110 has apertures 132 (see FIG. 2), which are used to hold the card product 108 on an exposed surface 110A (see FIG. 2) of the transport belt 110 during processing of the card product 108. Specifically, the vacuum source 128 creates negative pressure, which is coupled to the transport belt apertures 132 via the vacuum chamber 130. The negative pressure holds the card product 108 on the transport belt 110 during processing of the card product 108. As will be discussed in further detail below, during operation, the transport belt moves in a first direction 134 and a second direction 136 with a transport belt motor 138.

The print unit 106 includes a gantry 140 on which an ink jet print head 142 is disposed. The ink jet print head 142 may be any suitable conventional ink jet print head that is capable of performing direct printing operations on the card product 108 when the card product 108 is in a print position 144 along a processing axis 146. The gantry 140 moves the print head 142 in the first direction 134 and the second direction 136 through a print zone 148 during print operations along a fast scan axis 150. In some embodiments, the print zone 148 is bounded by the processing axis 146, the card feeders 102, and a top of the gantry 140, as shown in FIG. 1. In an embodiment, a fast scan axis refers to an axis along which the ink jet print head 142 is moved by the gantry 140 during an active phase of printing on the card product 108. During the active phase of printing, ink is discharged from the ink jet print head 142 onto a surface of the card product 108. The gantry 140 also moves the ink jet print head 142 along a slow scan axis 152. In an embodiment, the slow scan axis 152 refers to the axis along which the ink jet print head 142 is moved by the gantry 140 during an inactive printing phase, i.e., when the ink jet print head 142 is not discharging ink. In some embodiments, the gantry 140 moves the ink jet print head 142 along the slow scan axis 152 in order to move the ink jet print head 142 closer to the card product 108 in preparation for printing or further away from the card product 108. Furthermore, in some embodiments, the ink jet print head 142 may also include a sensor 154 for determining whether or not the card products 108 are placed on the transport belt 110 such that the sensor 154 may be used to locate the card product 108 during an alignment process.

In an embodiment of the present disclosure, any suitable coordinate system may be used to establish a location of the sensor 154 relative to the features of the card transport assembly 104, which includes the transport belt 110. In one embodiment, the coordinate system may include a first axis that is aligned with the processing axis 146 and the fast scan axis 150 along with a second axis that is aligned with the slow scan axis 152. Locations of the print zone 148, the transport belt 110, and the processing axis 146 may be stored in memory of the controller 126. Accordingly, the controller 126 can establish a location of the sensor 154 and a location of features below the sensor 154, such as the card product 108 and the transport belt 110, relative to the print position 144 and the print zone 148.

In the embodiment shown with reference to FIG. 1, the ink jet printer 100 is shown having two card feeders 102, two card flippers 112, and the associated mechanisms and motors used to operate the card feeders 102 and the card flippers 112. It should be noted that in some embodiments, one of the sets of the card feeders 102 and the card flippers 112 may process a first side of the card product 108, i.e., print on one side of the card product 108, while the other set of the card feeders 102 and the card flippers 112 may process a second side of the card product 108 opposite the first side of the card product 108, i.e., print on the opposite side of the card product 108. In another embodiment, one of the sets of the card feeders 102 and the card flippers 112 may deposit the card product 108 to the ink jet printer 100 and process a first card product 108 while the other set of the card feeders 102 and the card flippers 112 may remove a second card product 108 from the ink jet printer 100.

Figure 2:
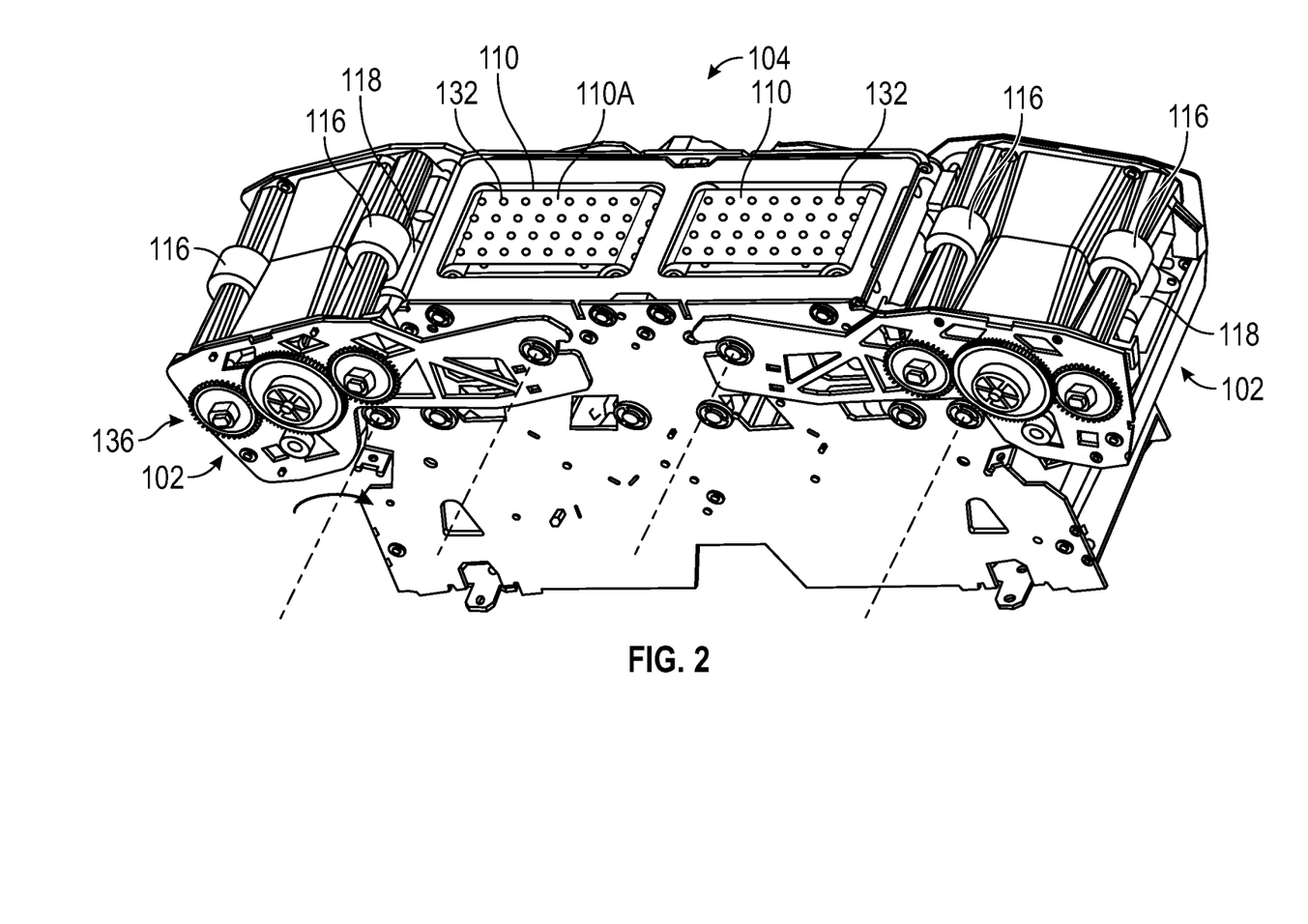

FIG. 2 is a perspective view of the card feeder 102 and card transport assembly 104 in accordance with an embodiment of the present invention. Here, the card feeders 102 are in a first orientation where the card feeders 102 may deposit the card product(s) 108 (not shown) onto the transport belt 110.

Figure 3:
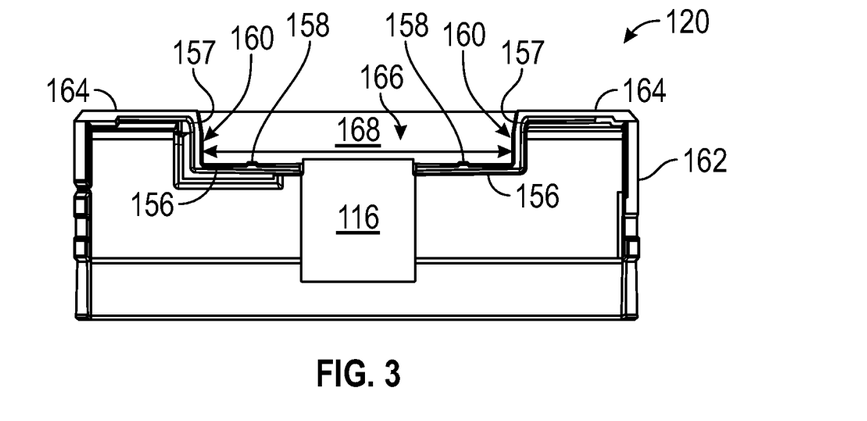
FIG. 3 shows an alignment bracket according to an embodiment of the present disclosure.

As mentioned above, in accordance with embodiments of the present invention, the card feeder 102 includes the alignment bracket 120 that aligns the card product 108 on the transport belt 110. As shown with respect to FIG. 3, the alignment bracket 120 includes a rear wall 156 along with guides 160 that extend perpendicularly from the rear wall 156. While a single rear wall 156 is shown in the Figure, in some embodiments, instead of having a single rear wall 156, the alignment bracket 120 may include a pair of rear walls 156, where each of the rear walls 156 of the pair of rear walls 156 has the configuration shown in FIG. 3. In accordance with alternative embodiments of the present invention, the rear wall 156 may include stops 158. The alignment bracket 120 also has a housing 162 and a front wall 164. As may be seen with reference to FIG. 3, the alignment bracket 120 also includes a slanted wall 157 that extends between the guide 160 and the front wall 164. The slanted wall 157 is slanted at an angle relative to the rear wall 156. In an embodiment, the slanted wall 157 may be at an angle that is greater than ninety degrees relative to the rear wall 156. In a further embodiment, the slanted wall 157 may be at an angle relative to the guide 160 and the front wall 164. In this embodiment, the slanted wall 157 may be at an angle between five degrees and thirty degrees relative to the guide 160. In a further embodiment, the slanted wall 157 may be at an angle twelve degrees relative to the guide 160. As will be discussed in more detail further on, the slanted wall 157 assists with guiding the card product 108 into the alignment bracket 120 during an alignment process of the card product 108.

Figure 4:
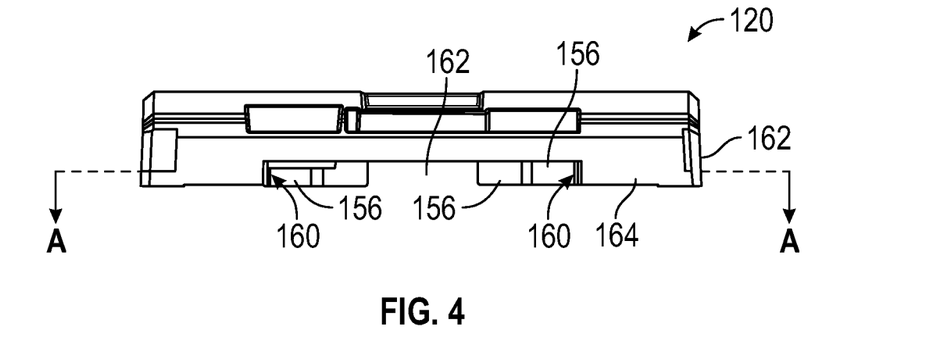
FIG. 4 illustrates a front view of the alignment bracket shown with reference to FIG. 3 in accordance with an embodiment of the present disclosure.
Figure 5:
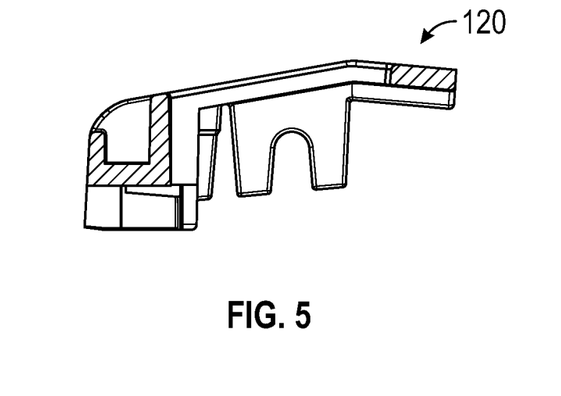
FIGS. 5 and 6 are side views of the alignment bracket in accordance with embodiments of the present disclosure.
Figure 6:
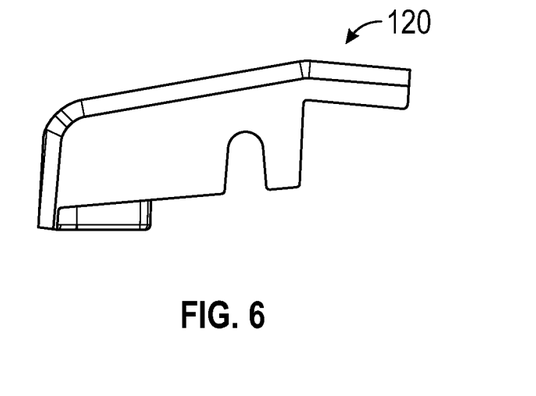

In some embodiments, the alignment bracket 120 may be formed entirely of metal or entirely of a plastic material. Furthermore, in some embodiments, the rear wall 156, the slanted walls 157, and the guides 160 may be formed of metal while the remaining portions of the alignment bracket 120 may be formed from plastic. FIGS. 4-6 further illustrate the alignment bracket 120 in accordance with embodiments of the present disclosure. In particular, FIG. 4 illustrates a front view of the alignment bracket 120 at an end, as will be detailed further below, in which the card product 108 is fed into during an alignment process. FIGS. 5 and 6 are additional views of the alignment bracket 120 in accordance with embodiments of the present disclosure.

Returning attention to FIG. 3, the guides 160 along with the slanted walls 157 extend between the front wall 164 and the rear wall 156 to form a cavity 166. The cavity 166 has a cavity width 168 that is slightly larger than a card product width 170 (FIG. 7) of the card product 108. In one embodiment, the cavity width 168 exceeds the card product width 170 in a range between 0.003" and 0.007" to a card height, or more preferably in a range between 0.0005" and 0.010" to a card height. In particular, the cavity width 168 should exceed the card product width 170 such that, as will be detailed further on, as the card product 108 is moved into the alignment bracket 120, the cavity width 168 allows for the card product 108 to easily and quickly fit into the alignment bracket while at the same time properly aligning the card product 108 on the transport belt 110 when the card product 108 is not properly deposited on the transport belt 110, as shown in greater detail with reference to FIGS. 7-11, which illustrate a cut-away view of the alignment bracket 120 along lines AA shown in FIG. 4.

Figure 7:
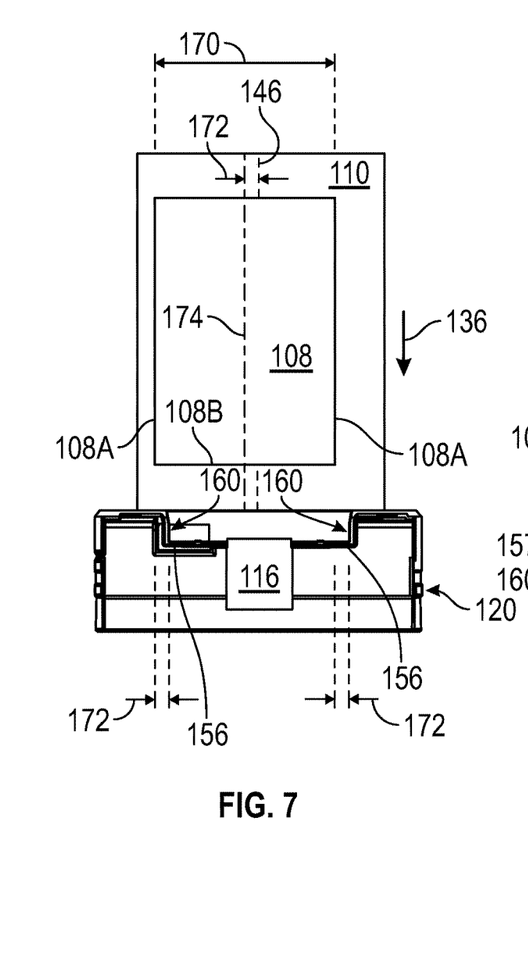
FIG. 7 shows a card product in a LOF variation according to an embodiment of the present invention.

Making reference to FIG. 7, occasionally, the card feeder 102 may deposit the card product 108 in a LOF variation. In a LOF variation, edges 108A of the card product 108 will have an offset 172 relative to the guides 160. Similarly, in a LOF variation, a card product axis 174 of the card product 108 will have the offset 172 relative to the processing axis 146. This may occur when the card product 108 shifts along an edge 108B of the card product 108. When the card product 108 has this LOF variation, the ink jet print head 142 may not print all the necessary information onto the card product 108. Specifically, the ink jet print head 142 moves along the card product 108 while printing the information onto the card product 108. If the card product 108 does not have the proper orientation on the transport belt 110, the information printed by the ink jet print head 142 will not appear properly on the card product 108. For example, a photo may be misaligned on the card product 108, or certain information may not be printed onto the card product 108. The alignment bracket 120 properly aligns the card product 108 such that the card product axis 174 aligns with the processing axis 146 thereby eliminating the offsets 168 between the card product axis 174 and the processing axis 146. The alignment bracket 120 also eliminates the offset 172 between the edges 108A and the guides 160.

Figure 8:
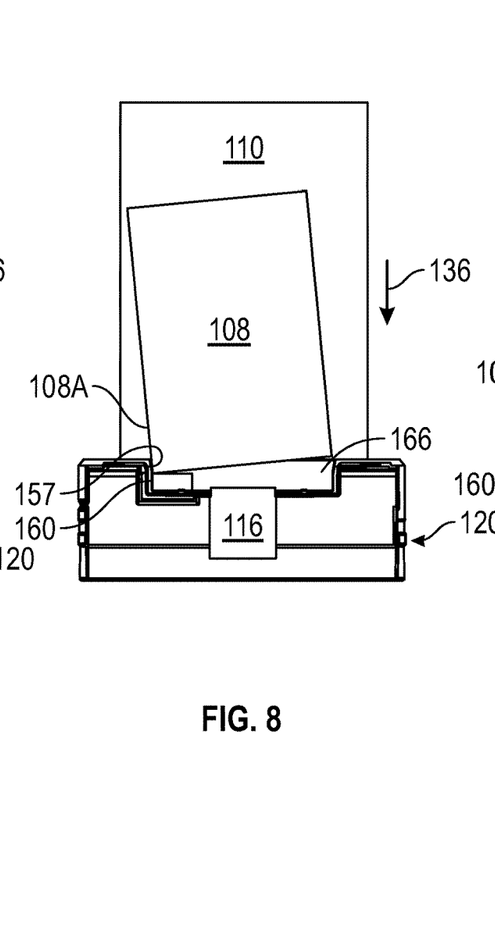
FIG. 8 shows a guide aligning a card product in accordance with an embodiment of the present invention.

To further illustrate the alignment process, the transport belt 110 is overdriven in the second direction 136. As the transport belt 110 is overdriven in the second direction 136, one of the edges 108A of the card product 108 contacts one of the slanted walls 157, as shown with respect to FIG. 8. The slanted wall 157 is configured such that as the transport belt 110 is overdriven in the second direction 136, the slanted wall 157 forces the card product 108 into the cavity 166 and along one of the guides 160. In particular, the edge 108A contacts one of the slanted walls 157 and is forced into contact with the guide 160. The transport belt 110 continues to be overdriven in the second direction 136 until the card product 108 moves into the alignment bracket 120 and the edge 108B of the card product 108 abuts the rear wall 156, as shown with reference to FIG. 9. In this configuration, the card product 108 is within the cavity 166 and, by virtue of the guides 160, the card product axis 174 aligns with the processing axis 146 and the guides 160 such that the card product 108 is properly aligned on the transport belt 110. In some embodiments, when the card product 108 is within the alignment bracket 120, the edge 108A abuts the guide 160 while the edge 108B abuts the rear wall 156. As mentioned above, in some embodiments, the rear wall 156 may include the stops 158. In embodiments where the rear wall 156 includes the stops 158, the transport belt 110 is overdriven until the card product 108 comes into contact with the stop 158.

As discussed above, the vacuum source 128 creates negative pressure, which holds the card product 108 on the transport belt 110. In accordance with an embodiment of the present invention, when the transport belt 110 is being overdriven in the second direction 136, the transport belt 110 is overdriven with such force that when the card product 108 comes into contact with the alignment bracket 120, i.e., the slanted walls 157, the guides 169, and/or the rear wall 156, the negative pressure holding the card product 108 against the transport belt 110 is overcome, thereby allowing alignment of the card product 108 via the alignment bracket 120, as described herein. Stated differently, the lateral force imparted to the card product 108 upon contact with the alignment bracket 120 as a result of being overdriven is enough to overcome the longitudinal force on the card product card 108 created by the negative pressure.

Figure 9:
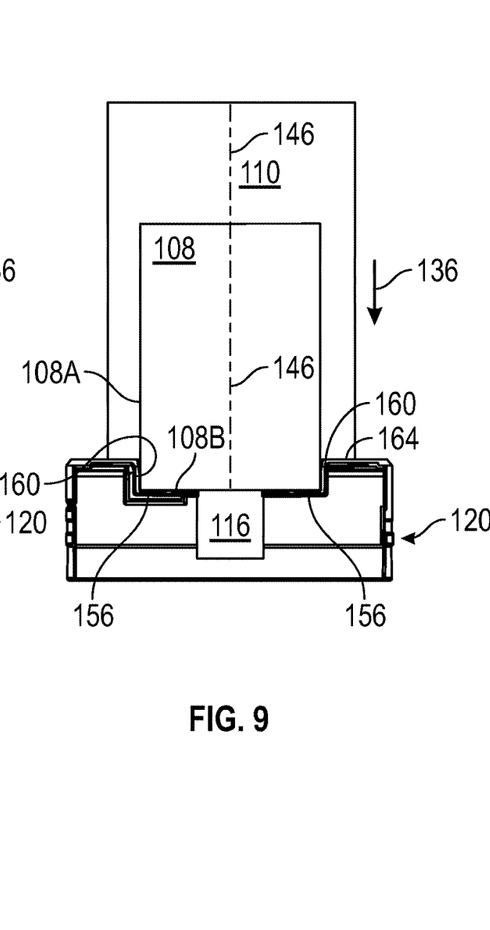
FIG. 9 illustrates the alignment bracket of FIG. 3 aligning a card product according to an embodiment of the present disclosure.
Figure 10:
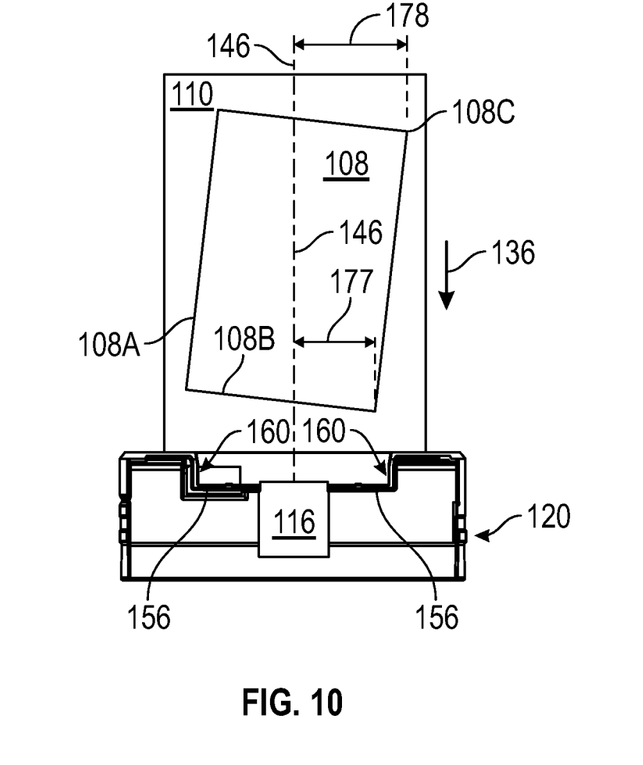
FIG. 10 shows a card product in a skewed configuration on a transport belt in accordance with an embodiment of the present disclosure.
Figure 11:
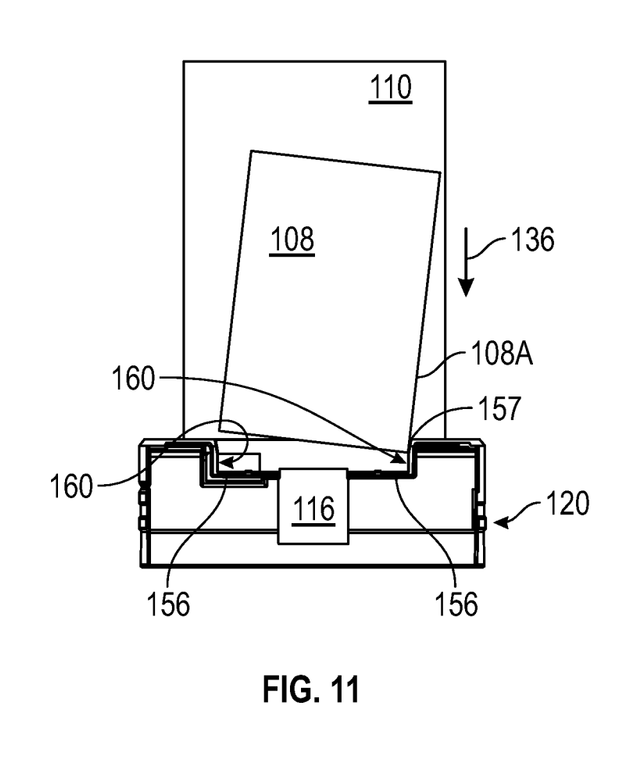
FIG. 11 illustrates the alignment bracket of FIG. 3 aligning a card product according to an embodiment of the present disclosure.

In addition to or in alternative to LOF variation, the card feeder 102 may deposit the card product 108 such that the card product 108 is skewed relative to the processing axis 146 and the transport belt 110, as shown with reference to FIG. 10. More specifically, in a skewed configuration, the edge 108A is skewed relative to the processing axis 146 by an offset 177. Moreover, in this skewed position, a corner 108C of the card product 108 is skewed relative to the processing axis 146 by an offset 178. It should be noted that while FIG. 10 illustrates the corner 108C more offset than the edge 108A, in accordance with embodiments of the present invention, the edge 108A may be more offset than the corner 108C in a skewed configuration. When the card product 108 has the skewed configuration shown with reference to FIG. 10, the alignment bracket functions to align the card product 108 with the processing axis 146. For example, the transport belt 110 is overdriven in the second direction 136 such that the card product 108 moves towards the alignment bracket 120. As the transport belt 110 is driven in the second direction 136, one of the edges 108A of the card product 108 contacts one of the guides 160, as shown with reference to FIG. 11. Moreover, the edge 108B of the card abuts the rear wall 156 as the transport belt 110 is driven in the second direction 136 as shown with reference to FIG. 9. Thus, the guide 160, along with the rear wall 156, position the card product 108 such that the card product 108 aligns with the processing axis 146, again as shown with respect to FIG. 9.

As mentioned above, the card feeder 102 deposits the card product 108 onto the transport belt 110 in a first orientation. After depositing the card product 108 onto the transport belt 110, the alignment bracket 120 ensures that the card product 108 aligns with the processing axis 146. The card feeder 102 moves into a second orientation to facilitate alignment of the card product 108 using the alignment bracket 120. Moreover, in order to allow the ink jet print head 142 proper room to discharge ink onto a surface of the card product 108 after alignment, the card feeder 102 moves into a third orientation to provide the proper amount of room for the ink jet print head 142. An example of this process is shown with reference to FIGS. 12-17.

Figure 12:
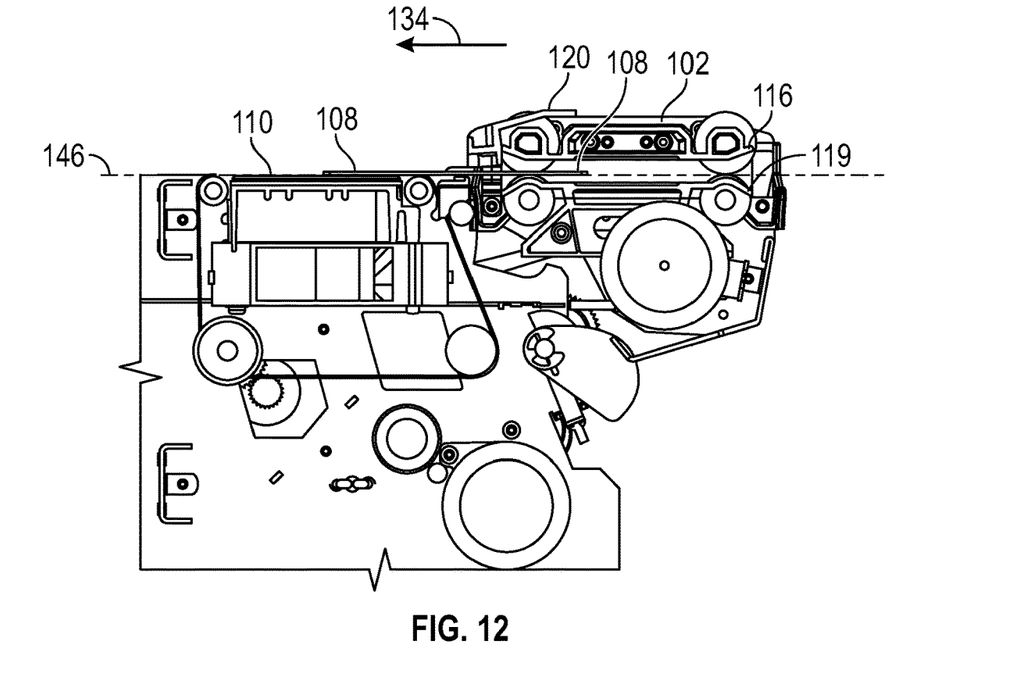
FIG. 12 illustrates a card feeder in a first orientation depositing a card product onto a transport belt according to an embodiment of the present disclosure.
Figure 13:
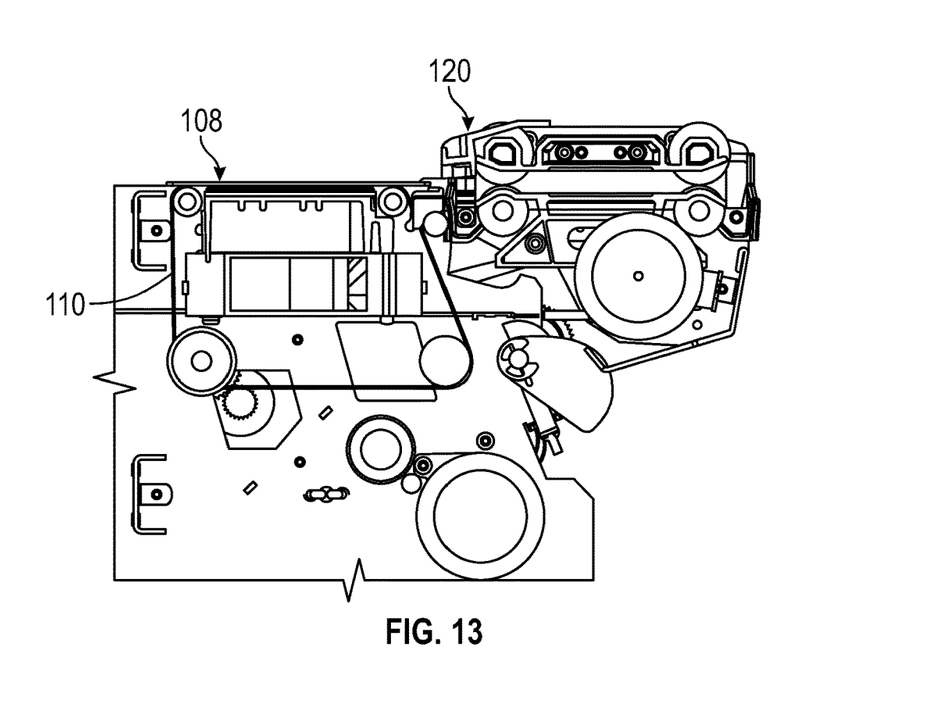
FIG. 13 shows a card product deposited onto a transport belt in accordance with an embodiment of the present disclosure.
Figure 14:
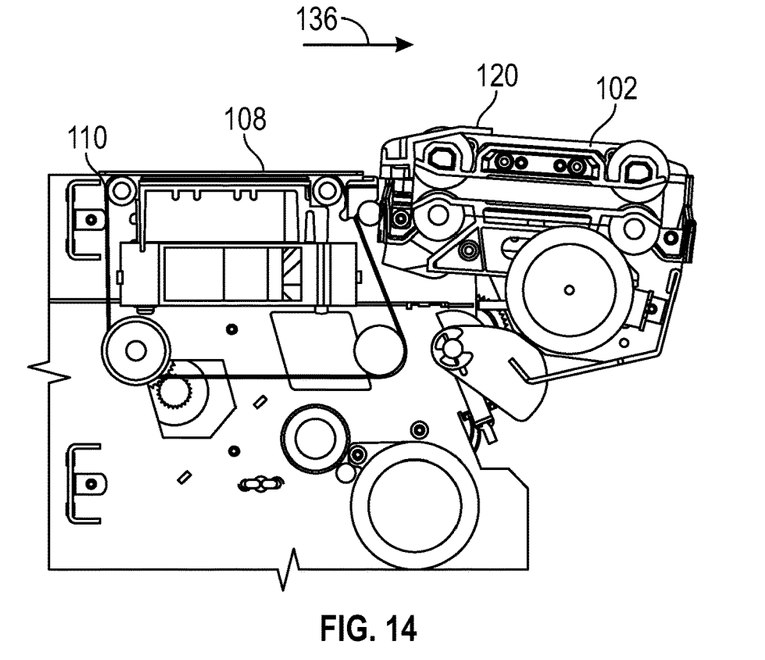
FIGS. 14-16 illustrate a card feeder in a second orientation where the alignment bracket of FIG. 3 aligns with a transport belt according to an embodiment of the present disclosure.

FIG. 12 illustrates the card feeder 102 depositing the card product 108 onto the transport belt 110 in the first direction 134 while FIG. 13 shows the card product 108 deposited onto the transport belt 110. In FIGS. 12 and 13, the card feeder 102 is in a first orientation that allows the depositing of the card product 108 onto the transport belt 110. As discussed above, the card product 108 may have been deposited onto the transport belt 110 with a LOF variation or in a skewed configuration such that the card product 108 is not aligned with the processing axis 146. In order to properly align the card product 108 with the alignment bracket 120, the card feeder 102 moves into a second orientation as shown with reference to FIG. 14. Once the card feeder is moved into the second orientation shown with reference to FIG. 14, the transport belt 110 is driven in the second direction 136 such that the card product 108 moves towards the alignment bracket 120. Once the card product 108 enters into the alignment bracket 120, the transport belt 110 is overdriven in the direction 136 such that the card product 108 enters the cavity 166 and is aligned with the processing axis 146, as shown with reference to FIG. 15 and previously discussed.

Figure 16:
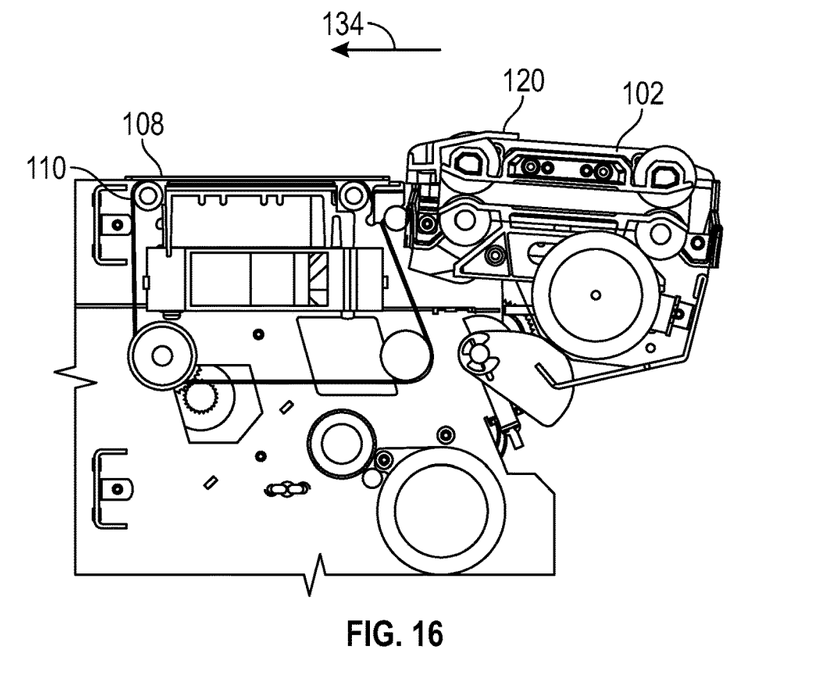

After the card product 108 is properly aligned with the alignment bracket 120, the transport belt 110 is driven in the first direction 134 such that the card product 108 exits the cavity 166 of the alignment bracket 120, as shown with regards to FIG. 16. At this point, the card feeder 102 moves into a third position, as shown with reference to FIG. 17. With the card feeder 102 in the third position shown with reference to FIG. 17, there is a proper amount of room for the ink jet print head 142 to move across the card or print head scan area and discharge ink onto a surface of the card product 108 such that all the information is formed on the card product 108 during a printing operation, thereby avoiding the problems of the conventional systems disclosed above.

Embodiments of the present disclosure are not limited to ink jet printers. In particular, embodiments of the present disclosure may be used with other types of printing devices. These other types of printing devices may include, but are not limited to, direct-to-card printers and retransfer printers that each use print ribbons. A direct-to-card printer uses a print ribbon and a thermal printhead where the print ribbon is heated with the thermal print head and an image is transferred to the card product 108. In embodiments that use direct-to-card printers, the alignment bracket 120 may be used to align the card product on transport rollers within the direct-to-card printer. In this embodiment, the card product 108 is properly aligned with the print ribbon and the thermal printhead during printing operations using the techniques disclosed herein. In embodiments where a retransfer printer is used, the card product 108 is properly aligned with the print ribbon during printing operations also using the techniques disclosed herein.

Figure 18:
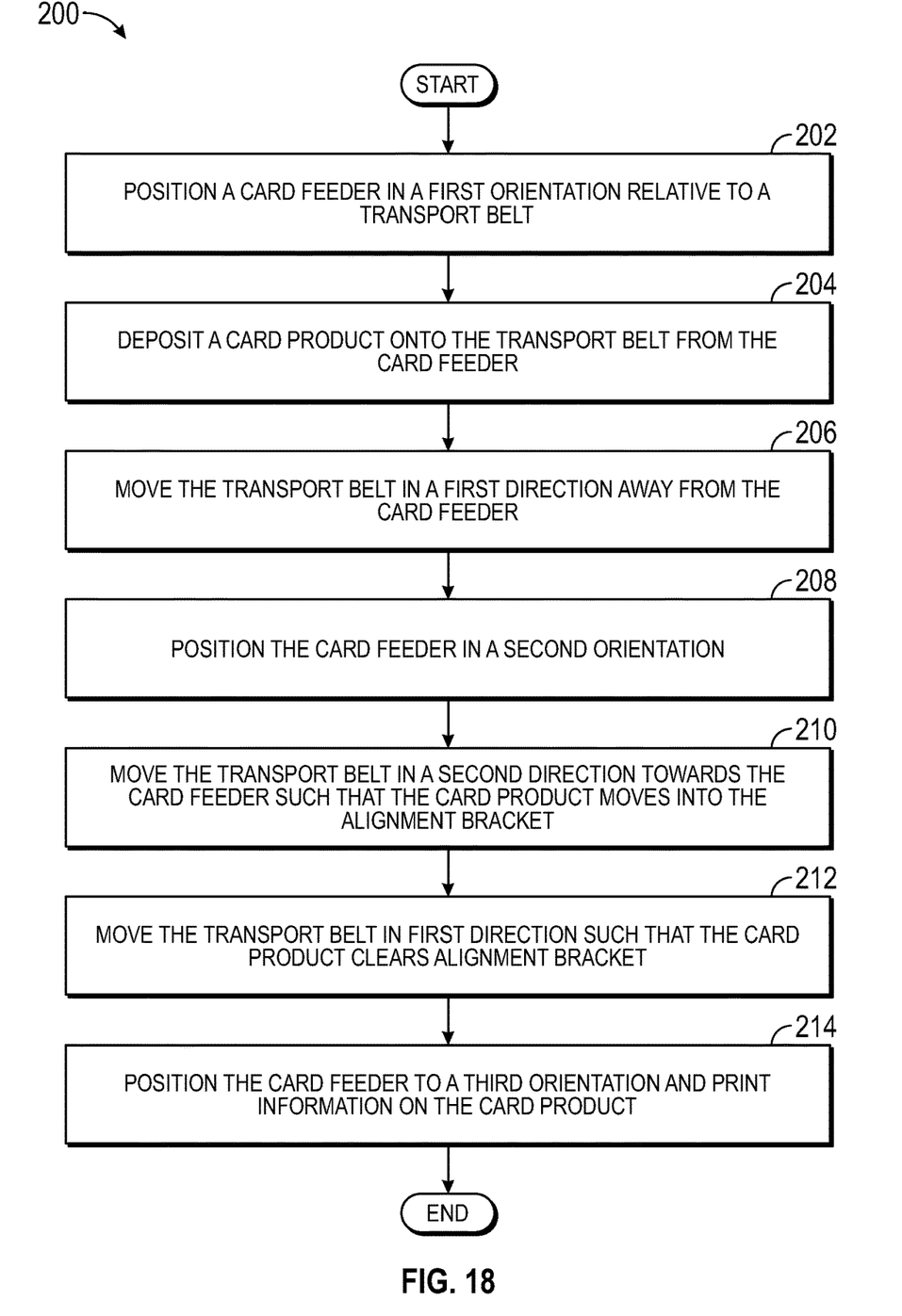
FIG. 18 illustrates a method for aligning a card on a transport belt of an ink jet printer, in accordance with an embodiment of the present disclosure.

Now making reference to FIG. 18, this Figure illustrates a method 200 for aligning a card on a transport belt of an ink jet printer in accordance with an embodiment of the present disclosure. Initially, in an operation 202, a card feeder is positioned in a first orientation relative to a transport belt. Once the card feeder is in the first orientation, the card feeder deposits a card product onto the transport belt in an operation 204. As an example, in FIG. 12, the card feeder 102 is positioned in a first orientation relative to the transport belt 110 such that the card product 108 aligns with the processing axis 146. In the example, the card feeder 102 deposits the card product 108 onto the transport belt 110 as shown with reference to FIG. 13.

Figure 15:
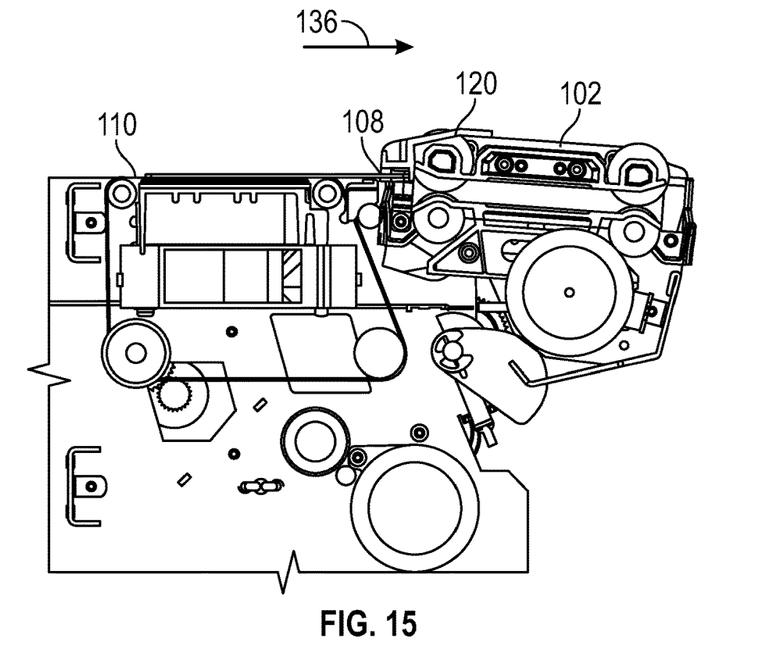

After the card feeder deposits the card product onto the transport belt, the transport belt moves in a first direction away from the card feeder in an operation 206. In the example, a sensor 154 may detect the presence of the card product 108 and the controller 126 controls the transport belt 110 to move in the first direction 134 away from the card feeder 102. Next, in an operation 208, the card feeder is then positioned into a second orientation where the alignment bracket of the card feeder aligns with the processing axis. Returning to the example, in FIG. 14, the card feeder 102 is positioned in an orientation where the alignment bracket 120 aligns with the processing axis 146. When the alignment bracket aligns with the processing axis in the second orientation, the transport belt is moved in a second direction opposite the first direction towards the card feeder and the alignment bracket such that the card product is moved into the alignment bracket in an operation 210. In the example, the transport belt 110 is moved in the second direction 136 as shown in FIG. 15 until the card product 108 moves into the alignment bracket 120, as shown in FIG. 9. As previously discussed, when the card product 108 moves into the alignment bracket 120, the card product 108 aligns with the processing axis 146. Optionally, during the operation 210, the transport belt 110 may be overdriven as described above such that the alignment bracket 120 aligns the card product 108 with the processing axis 146. As discussed above, overdriving the transport belt 110 allows the card product 108 to move relative to the transport belt 110 when the card product comes into contact the alignment bracket 120, such as when the card product contacts one or all of the slanted wall 157, the guide 160, and the rear wall 156.

Figure 17:
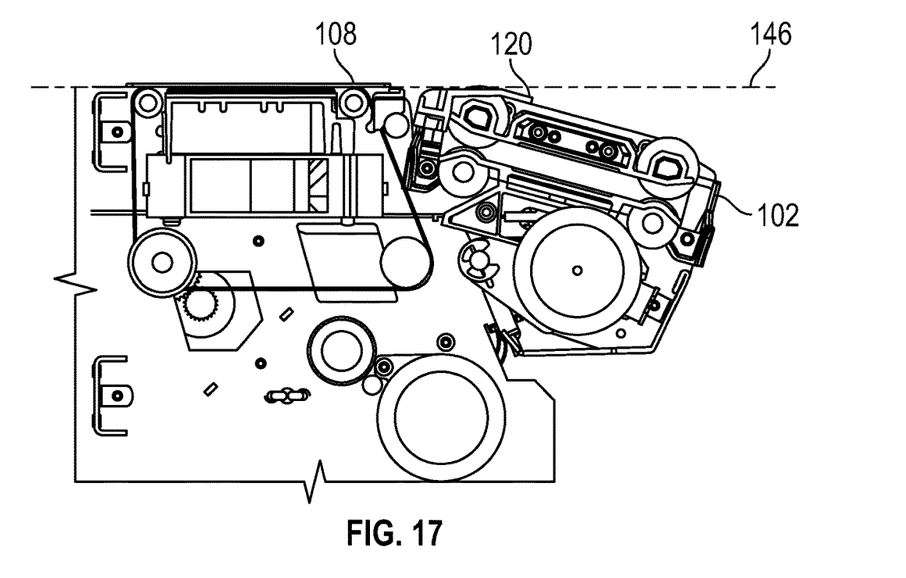
FIG. 17 shows the card feeder in a third orientation which provides a proper amount of room for an ink jet print head to discharge ink onto a surface of the card product.

After the card product is aligned with the processing axis in the operation 210, the transport belt is moved in the first direction in order to clear the card product from the alignment bracket in an operation 212. Once the card product clears the alignment bracket, the card feeder is positioned in a third orientation and information is printed onto the card in an operation 214. Returning to the example, in the operation 210, the transport belt 110 moves in the first direction 134 such that the card product 108 clears the alignment bracket 120, as shown with reference to FIG. 16. Then, in the operation 214, the card feeder 102 is positioned in a third orientation, as shown in FIG. 17, where the card feeder 102 is lower than the processing axis 146 in order to clear the print zone 148 for the ink jet print head 142. Since the card feeder 102 is free of the print zone 148, the ink jet print head 148 may freely move over the card product 108 and discharge ink onto the card product 108.

As described, embodiments of the present disclosure align the card product 108 on the transport belt 110 of the ink jet printer 100. In accordance with further embodiments of the present disclosure, instead of the transport belt 110, the transport mechanism include transport rollers in place of the transport belt 110. In this embodiment, instead of the transport belt 110, the transport rollers function to move the card product 108 during processing of the card product 108 such that the alignment bracket 120 aligns the card product 108 with respect to the transport rollers. In an embodiment that uses the transport rollers, the transport rollers function in a manner similar to the transport belt 110 described herein. For example, instead of depositing the card product 108 onto the transport belt 110, the card feeder 102 deposits the card product 108 onto the transport rollers. Furthermore, when the transport rollers are used in place of the transport belt 110, the transport rollers are controlled in a manner similar to the transport belt 110 such that the card product 108 would be aligned with the alignment bracket 120 as described herein.

The above description is intended to be illustrative, and not restrictive. For example, the above-described examples (or one or more aspects thereof) may be used in combination with others.

What is claimed is:

1. A method for aligning a card for printing within a printing device, the printing device including a transport mechanism, a print unit that is configured to move relative to the transport mechanism thereby defining a print area, and a card feeder having an alignment bracket disposed proximate to the transport mechanism, the method comprising:
   positioning the card feeder in a first orientation and depositing the card from the card feeder onto the transport mechanism along a processing axis;
   moving the transport mechanism in a first direction where the card moves away from the card feeder along the first direction on the transport mechanism;
   positioning the card feeder in a second orientation different from the first orientation where the alignment bracket aligns with the transport mechanism along with the processing axis, the alignment bracket having a rear wall that engages the card when the card is moved into the alignment bracket and a guide that projects in a perpendicular direction from the rear wall;
   moving the transport mechanism in a second direction opposite the first direction such that the card moves into the alignment bracket and an edge of the card abuts the rear wall, wherein the guide aligns the card along the processing axis;
   moving the transport mechanism in the first direction such that the card clears the alignment bracket; and
   positioning the card feeder to a third orientation separate from the first and second orientations where the card feeder is outside the print area when the card feeder is in the third position.

2. The method of claim 1, wherein the alignment bracket further includes a slanted wall extending from the guide.

3. The method of claim 2, wherein the transport mechanism is overdriven when moving in the second direction such that the card moves into the alignment bracket and the edge abuts the rear wall.

4. The method of claim 3, wherein the card feeder deposits the card with a left of form variation where a central axis of the card is offset from the processing axis in the left of form variation where a first edge of the card abuts the slanted wall and then a second edge abuts the guide while the transport mechanism is overdriven in the second direction such that slanted wall and the guide align the central axis of the card with the processing axis as the transport mechanism is overdriven in the second direction and the card moves into alignment bracket.

5. The method of claim 3, wherein the card feeder deposits the card in a skewed configuration relative to the processing axis where a first edge of the card abuts the guide and a second edge of the card abuts the rear wall as the transport mechanism is overdriven in the second direction such that the card is aligned with the processing axis.

6. The method of claim 1, wherein printing device is an ink jet printer and the ink jet printer further includes a sensor and a controller and the method further comprises:
  detecting, by the sensor, the presence of the card on the transport mechanism; and
  sending, from the controller, an instruction to move the transport mechanism in the second direction in response to the sensor detecting the presence of the card on the transport mechanism.

7. The method of claim 2, wherein the alignment bracket further includes:
  a housing;
  a front wall forming a front portion of the housing;
  a second slanted wall opposite the slanted wall; and
  a second guide opposite the guide where the slanted walls and the guides extend between the front wall and the rear wall thereby defining a cavity having a width that is greater than a width of the card.

8. The method of claim 3, wherein the card feeder deposits the card with a left of form variation where a central axis of the card is offset from the processing axis in the left of form variation where a first edge of the card abuts the slanted wall and then a second edge abuts the rear wall while the transport mechanism is overdriven in the second direction such that slanted wall and the rear wall align the central axis of the card with the processing axis as the transport mechanism is overdriven in the second direction and the card moves into alignment bracket.

9. The method of claim 1, wherein the printing device is an ink jet printer and the print unit includes an ink jet print head.

10. A printer comprising:
  a transport mechanism having an exposed surface configured to engage and feed a card along a processing axis; and
  an alignment bracket disposed proximate to the transport mechanism, the alignment bracket having a rear wall, a guide projecting in a perpendicular direction from the rear wall, and a slanted wall extending from the guide, wherein the rear wall engages a card when the card is moved into the alignment bracket and the guide is configured to align the card with the processing axis on the transport mechanism when the card moves into the alignment bracket.

11. The printer of claim 10, wherein the alignment bracket further includes:
  a housing;
  a front wall forming a front portion of the housing;
  a second slanted wall; and
  a second guide, wherein the slanted walls and the guides extend between the front wall and the rear wall thereby defining a cavity having a width that is greater than a width of the card.

12. The printer of claim 10, further comprising a card feeder configured to deposit the card onto the exposed surface of the transport mechanism from a first end of the card feeder, wherein the alignment bracket is disposed at a top side of the card feeder proximate the first end of the card feeder.

13. The printer of claim 10, wherein the printer further comprises a transport mechanism motor configured to move the transport mechanism in a first direction and a second direction opposite the first direction.

14. The printer of claim 13, further comprising:
  a sensor configured to detect the presence of the card on the transport mechanism; and
  a controller configured to send an instruction to move the transport mechanism in the second direction via the transport mechanism motor in response to the sensor detecting the presence of the card on the transport mechanism.

15. The printer of claim 14, wherein the printer is further configured to:
  overdrive the transport mechanism in the second direction via the controller; and
  feed the card into the alignment bracket such that the printer aligns the card with the processing axis via the alignment bracket when the card is deposited with a left of form variation where a central axis of the card is offset from the processing axis in the left of form variation.

16. The printer of claim 14, wherein the printer is further configured to:
  overdrive the transport mechanism in the second direction via the controller; and
  feed the card into the alignment bracket such that the printer aligns the card with the processing axis via the alignment bracket when the card is deposited in a skewed configuration relative to the processing axis.

17. The printer of claim 10, further comprising a card feeder having a first end proximate to the transport mechanism for depositing the card onto the transport mechanism.

18. The printer of claim 17, wherein the card feeder comprises:
  a card feeder frame; and
  a motorized feed roller supported by the card feeder frame, wherein the motorized feed roller is configured to cause the card to be deposited onto the transport mechanism.

19. An alignment bracket for aligning a card product deposited onto a transport mechanism of a printer, the alignment bracket comprising:
  a housing;
  a front wall forming a front portion of the housing;
  a rear wall within the housing;
  a pair of slanted walls extending from the front wall; and
  a pair of guides, each guide perpendicularly extending between a respective slanted wall of the pair of slanted walls and the rear wall such that the rear wall and the pair of guides define a cavity within the housing, wherein the rear wall is configured to engage with the card product moved into the alignment bracket and the pair of guides is configured to align the product in parallel with the pair of guides when the card is in the alignment bracket.

* * * * *